(12) United States Patent
Christie

(10) Patent No.: US 6,687,244 B1
(45) Date of Patent: Feb. 3, 2004

(54) ATM TRANSPORT SYSTEM

(75) Inventor: Joseph Michael Christie, San Bruno, CA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/543,671

(22) Filed: Apr. 7, 2000

Related U.S. Application Data

(63) Continuation of application No. 08/933,297, filed on Sep. 18, 1997, now Pat. No. 6,081,529, which is a continuation of application No. 08/562,206, filed on Nov. 22, 1995, now Pat. No. 5,703,876.

(51) Int. Cl.[7] .......................... H04L 12/56; H04L 12/66
(52) U.S. Cl. .................. 370/356; 370/395.61; 370/522
(58) Field of Search .................. 370/395.6, 395.61, 370/356, 465, 466, 522, 477

(56) References Cited

U.S. PATENT DOCUMENTS

| | | |
|---|---|---|
| 4,720,850 A | 1/1988 | Oberlander et al. |
| 4,763,317 A | 8/1988 | Lehman et al. |
| 5,115,427 A | 5/1992 | Johnson, Jr. et al. |
| 5,182,550 A | 1/1993 | Masuda et al. |
| 5,274,680 A * | 12/1993 | Sorton et al. ............... 375/371 |
| 5,289,536 A | 2/1994 | Hokari |
| 5,438,527 A | 8/1995 | Feldbaumer et al. |
| 5,459,721 A | 10/1995 | Yoshida |
| 5,469,501 A | 11/1995 | Otsuka |
| 5,473,677 A * | 12/1995 | D'Amato et al. ....... 379/114.28 |
| 5,479,402 A * | 12/1995 | Hata et al. .................. 370/397 |
| 5,483,527 A * | 1/1996 | Doshi et al. ................ 370/399 |
| 5,513,180 A | 4/1996 | Miyake et al. |
| 5,519,690 A | 5/1996 | Suzuka et al. |
| 5,526,359 A | 6/1996 | Read et al. |
| 5,541,917 A | 7/1996 | Farris |
| 5,583,849 A | 12/1996 | Ziemann et al. |
| 5,765,108 A | 6/1998 | Martin et al. |
| 5,926,479 A * | 7/1999 | Baran ..................... 370/395.61 |
| 6,324,179 B1 | 11/2001 | Doshi et al. |

FOREIGN PATENT DOCUMENTS

| | | |
|---|---|---|
| HU | 216 229 B | 5/1999 |
| JP | 1013534 | 1/1989 |
| JP | 01-300738 | 5/1989 |
| JP | 4-100452 | 8/1990 |
| JP | 05-022403 | 1/1993 |
| JP | 5327751 | 12/1993 |
| JP | 06-006320 | 1/1994 |
| JP | 07-250099 | 9/1995 |
| JP | 09-261338 | 3/1997 |
| WO | WO 95/31057 | 11/1995 |
| WO | 8242288 | 6/1996 |

OTHER PUBLICATIONS

Helen A. Bauer, John J. Kulzer, Edward G. Sable, "Designing Service–Independent Capabilities for Intelligent Networks," IEEE, Dec. 1988, pp. 31–41.

ITU–T Q.1219, "Intelligent Network User's Guide For Capability Set 1," Apr., 1994.

Thorner, "Intelligent Networks, Capter 2," 1994, Artech House, pp. 11–107.

ITU–T, Recommendation Q.722, "Specifications of Signalling System No. 7, General Function of Telephone Messages and Signals," 1993.

* cited by examiner

*Primary Examiner*—Min Jung

(57) ABSTRACT

The invention is an ATM transport system that transports user information from a continuous signal transport system. The ATM transport system uses telecommunications signaling associated with the continuous signals to determine if the continuous signals are transporting any user information. If so, ATM cells containing user information are generated and transmitted, but if not ATM cells are not generated and transmitted. The invention includes an ATM interworking multiplexer and in some embodiments, a processor.

18 Claims, 2 Drawing Sheets

ATM TRANSPORT SYSTEM

CROSS-REFERENCE TO RELATED APPLICATION

This application is a continuation of prior application Ser. No. 08/933,297 filed Sep. 18, 1997, entitled "ATM Transport System," now U.S. Pat. No. 6,081,529 incorporated by reference into this application, and which is a continuation of Ser. No. 08/562,206 filed now November 22 U.S. Pat. No. 5,703,876 issued Dec. 30, 1997.

BACKGROUND

At present, Asynchronous Transfer Mode (ATM) technology is being used to provide high speed transport for traffic carried by older transport formats such as DS1 and DS0. This ATM transport technique uses an ATM interworking multiplexer (ATM mux) to convert telecommunications traffic from the older formats into ATM cells that can be transported over broadband connections. At the terminating end of the broadband system, the ATM cells are re-converted back into the older format by another ATM mux for delivery to the older transport system.

Many older transport formats require the transmission of a continuous signal even when no user traffic is being transported. For example, a DS0 connection continuously transmits a 64,000 bit/second signal whether or not the DS0 connection is transporting any user traffic. This causes a problem in the above-described transport scenario. The ATM mux will convert the DS0 signal into ATM cells for transport, and since the DS0 signal is continuous, a continuous stream of ATM cells must be transported by the ATM network. This occurs even when no user traffic is being transported. The idle DS0 signal is still transported in empty ATM cells. Methods to detect these idle continuous signals that do not transport user information have included analyzing information samples from the continuous signals to detect idle codes. However, these idle codes may be emulated by user information such as voice or data. This causes problems when trying to determine whether or not a signal carries user information.

The current situation represents a waste of resources. At present, there is a need for an ATM system that can transport continuous signal formats when they carry user traffic, but not when they do not carry user traffic.

SUMMARY

The invention includes an asynchronous transfer mode (ATM) system for transporting user information in ATM cells. The ATM cells contain a virtual path identification/virtual channel identification (VPI/VCI). The user information is from a continuous-signal transport system that produces telecommunications signaling related to the continuous signal. The continuous signal is associated with the VPI/VCI.

The system comprises a processor and ATM interworking multiplexer. The processor receives telecommunications signaling and detects, based on the telecommunications signaling, when the continuous signal is transporting user information and when the continuous signal is not transporting user information. The processor associates the continuous signal with the VPI/VCI. The processor also provides a control instruction to enable the VPI/VCI when the continuous signal is transporting user information, and provides a control instruction to disable the VPI/VCI when the continuous signal is not transporting user information.

The ATM interworking multiplexer is coupled to the processor. The ATM interworking multiplexer receives the continuous signal and associates it with the VPI/VCI. The ATM interworking multiplexer receives the control instructions from the processor and generates and transmits ATM cells containing the VPI/VCI and the user information in response to the enabling control instruction. The ATM interworking multiplexer stops generating and transmitting ATM cells containing the VPI/VCI in response to the disabling control instruction.

The invention has many variations. The telecommunications signaling protocol could by Signaling System #7. The processor might use an SS7 Initial Address Message (IAM) to detect when the continuous signal transports user information. The processor might use a Circuit Identification Code (CIC) in the SS7 IAM to identify the continuous signal and to associate the continuous signal with the VPI/VCI. The processor might use a an SS7 Release message (REL) or Release Complete message (RLC) to detect when the continuous signal no longer transports user information.

The invention might include a Signal Transfer Point (STP) that is linked to the processor and that transfers telecommunications signaling to the processor. The STP might transfer copies of Signaling System #7 (SS7) message routing labels to the processor. The STP might transfer copies of SS7 Initial Address Message (IAM), Release message (REL), or Release Complete message (RLC) routing labels to the processor. The STP might transfer copies of SS7 routing labels to the processor that have particular Originating Point Codes (OPCs) and Destination Point Codes (DPCs).

The ATM interworking multiplexer might receive a continuous DS3 signal or a continuous DS1 signal. The ATM interworking multiplexer might transmit the ATM cells over a SONET connection. In some embodiments, the ATM interworking multiplexer supports multiple signals. Individual VPI/VCIs would correspond to individual continuous signals. The ATM interworking multiplexer would include: a continuous signal interface to receive the continuous signals, an ATM Adaption Layer (AAL) to convert the continuous signals into ATM cells with corresponding VPI/VCIs, an ATM interface to transmit the ATM cells, and a control interface to receive the control instructions and control the AAL to generate and transmit cells with enabled VPI/VCIs and to stop the generation and transmission of ATM cells with a disabled VPI/VCIs.

The invention provides the advantage of having the ATM system only transport cells that actually carry user information. Cells containing the continuous signal, but no user information are not transmitted. This provides for efficient allocation and use of bandwidth in the ATM system.

DETAILED DESCRIPTION

For purposes of clarity, the term "connection" will be used to refer to the transmission media used to carry user traffic. The term "link" will be used to refer to the transmission media used to carry signaling. On the Figures, connections are shown by a single line and signaling links are shown by double lines.

Figure 1:
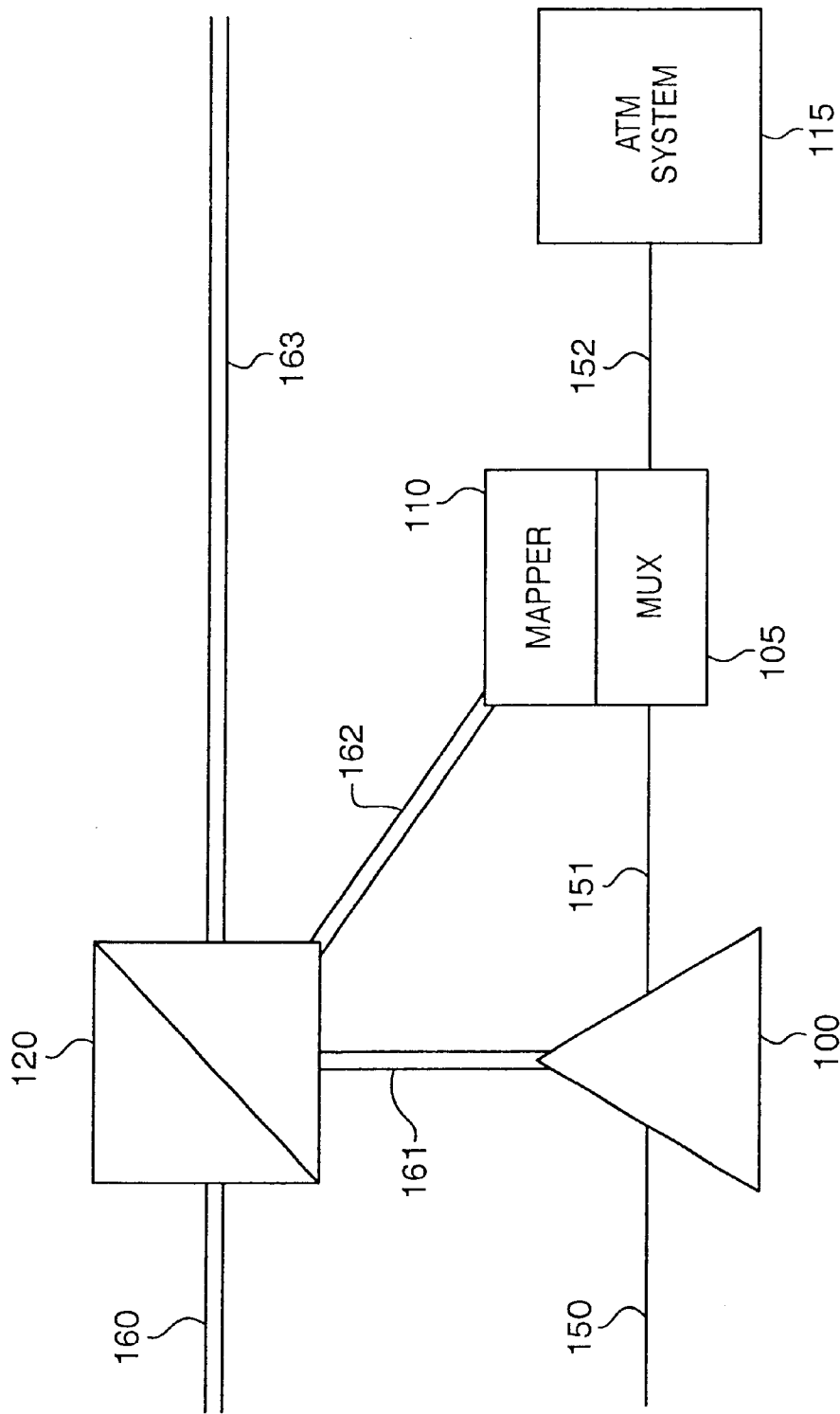
FIG. 1 is a block diagram of a version of the present invention.

FIG. 1 depicts a version of the present invention. Shown are switch 100, ATM interworking multiplexer (mux) 105, mapper 110, ATM system 115, and signal transfer point (STP) 120. These components are connected by connections 150–152 and linked by links 160–163 as shown. Those skilled in the art are aware that large networks have many more components than are shown, but the number of these components has been restricted for clarity. The invention is fully applicable to a large network.

Switch 100 is a conventional switch that transmits user traffic within continuous signals. Examples of continuous signals are DS3, DS1, or DS0 signals. Connections 150 and 151 are conventional transmission media that propagate continuous signals in order to transport user information. ATM system 115 and connection 152 are conventional components that transport ATM cells. The components mentioned in this paragraph are well known in the art.

Telecommunications signaling is used to set-up tear down connections for a call. STP 120 routes the signaling over signaling links 160–163. The invention is described in terms of signaling system #7 (SS7), but those skilled in the art are aware of other signaling systems that could also be used with the invention. Signaling links 160–163 could be well known SS7 links. STP 120 is a signaling device, for example, it could be a conventional STP that has been altered in accord with the invention. In other embodiments described later, no alteration of the STP would be required.

In this embodiment, STP 120 is altered to copy the routing labels of particular SS7 messages and transmit them to mapper 110 over link 162. The routing label of an SS7 message carries routing information for the signaling message such as the origination point code (OPC) and destination point code (DPC) of the message. The routing label contains a circuit identification code (CIC) and a message type. The CIC identifies the actual circuit that carries the user traffic on a given call. Typically, the CIC identifies a DS0 connection. The message type identifies the type of message. In SS7, the initial address message (IAM) is used to set-up the call, and the release message (REL) and/or the release complete message (RLC) is used to tear down the call. Typically, an REL causes a call connection to be released and the RLC is an acknowledgement of the release. But occasionally, the REL is not received and the RLC actually causes the release of a call connection.

Mapper 110 would only need the IAMs, and RELs for calls that use connections 151. To get a more robust system, the RLCs could also be used. The RLC would act as an acknowledgment when the REL is received, but would be used to for tear down when no REL is received. Alternatively, the use of the RLC could be omitted if the unreceived REL messages still allowed for tolerable performance.

Those skilled in the art will be familiar with various ways to select these routing labels. A discrimination function could select the proper messages based on the message type, the OPC, and/or the DPC. For example, messages type would be screened for IAM, REL, or RLC codes. These messages would then be screened for the OPC or DPC of switch 100. Additional screening criteria will be appreciated by those skilled in the art. The discrimination function could be in STP 120, in mapper 110, or distributed in between the two. For example, STP 110 could send only IAM, REL, and RLC routing labels to mapper 110, and mapper 110 would only use routing labels that had an OPC/DPC combination associated with connection 151.

Mapper 110 would typically be a processor that has conventional interface software that is functional to receive and process the routing labels provided by STP 120, however, other processing configurations that support the requirements of the invention are also contemplated. In addition, mapper 110 would be functional to use the OPC, DPC, and CIC of the signaling messages to retrieve pre-defined virtual connection associated with the particular CIC. The virtual connection would be identified by the combination of a virtual path identification (VPI) and virtual channel identification (VCI). ATM VPIs and VCIs are well known. Typically each DS0 on one side of mux 105 would have a corresponding VPI/VCI on the other.

In addition, mapper 110 would be functional to send control messages to mux 105. For call-set up, the control message would instruct mux 105 to enable the VPI/VCI associated with the call. For call tear down, the control message would instruct mux 105 to disable the VPI/VCI associated with call Mux 105 would be configured to interwork the DS0s on connection 151 with their corresponding VPI/VCIs on connection 152. Mux 105 would convert user traffic from the DS0 into ATM cells that identify the corresponding VPI/VCI. Mux 105 would then transmit the ATM cells over connection 152 to ATM system 120. Mux 105 is also functional to perform reciprocal processing for ATM cells from connection 152 that contain user information that is bound for transport over connection 151. Mux 105 would be functional to enable and disable VPI/VCIs as instructed by the control messages from mapper 110. This means that ATM cells would only be transmitted over an enabled VPI/VCI. If the VPI/VCI is disabled, mux 105 would not transmit cells on that virtual connection.

In one embodiment, the system would operate as follows for a call incoming over connection 150. A DS0 on connection 150 would be seized for a call connection to switch 100. An IAM would be received over link 160 and routed by STP 120 over link 161 to switch 100. Switch 100 would process the IAM and select a DS0 on connection 151. Switch 100 would generate another IAM for transfer to the network over link 161 and STP 120.

STP 120 would check the message type, OPC, and DPC to determine that this was and IAM from switch 100 concerning connection 151. As a result STP 120 would copy the routing label of the IAM and transfer it to mapper 115 over link 162. Mapper 115 would identify the VPI/VCI that corresponds to the OPC/DPC/CIC in the IAM. Mapper 110 would then send a control message to mux 105 instructing mux 105 to enable the VPI/VCI. Once the VPI/VCI was enabled, mux 105 would begin to transmit ATM cells using the VPI/VCI over connection 152 to ATM system 115. The cells would contain information from the DS0 on connection 151 identified by the IAM routing label.

When the call is terminated, an REL would be transmitted over the signaling system to switch 100. STP 120 would check the message type and the DPC to determine that this was an REL to switch 100 concerning connection 151. As a result, STP 120 would copy the routing label of the REL and transfer it to mapper 110 over link 162. Mapper 110 would identify the VPI/VCI that corresponded to the OPC/DPC/CIC in the REL. Mapper 110 would then send a control message to mux 105 instructing it to disable the VPI/VCI. As a result, mux 105 would not transmit cells over the disabled VPI/VCI. If RLCs are used, they would act as an acknowledgment for the REL, and if the REL was not received, then the RLC would be used in the same way the REL is used above.

A similar procedure would occur for calls that are set-up from the opposite direction—from ATM system 115 to connection 150. In this case, VPI/VCIs would be enabled/disabled based on the IAMs and RELs (and possibly RLCs) that are related to connection 151.

The invention has a significant advantage because virtual connections are only used when they are needed during a call and are disabled when the call is over. This prevents the mux from transmitting empty cells that do not contain any user traffic. This allows for a more efficient allocation and use of bandwidth in the ATM network.

Figure 2:
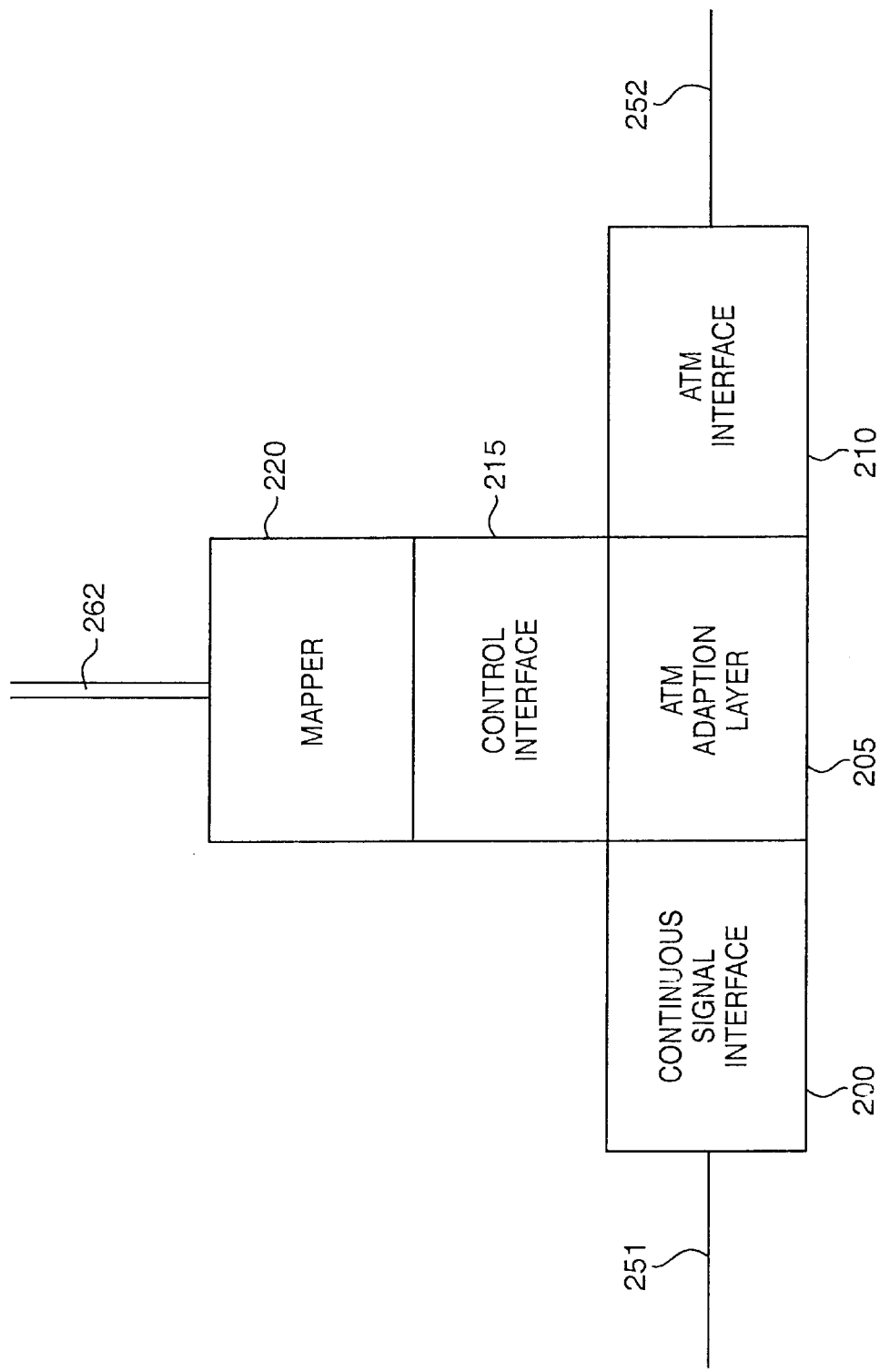
FIG. 2 is a block diagram of a version of the present invention.

FIG. 2 shows a more detailed version of the mux and the mapper. Shown are continuous signal interface 200, ATM adaption layer (AAL) 205, ATM interface 210, control interface 215, and mapper 220. Also shown are continuous signal connection 251, ATM connection 252 and signaling link 262.

Continuous signal connection 251 transports user traffic using continuous signal with an example being DS3 signals. ATM connection 252 transports ATM cells with one example being a SONET connection. An example of signaling link 262 would be an SS7 link. Continuous signal interface 200 is operable to receive user information in continuous signal formats, such as the DS3 format. Signals such as DS3 and DS1 are typically demuxed into component DS0 signals by continuous signal interface 200.

AAL 205 comprises both a convergence sublayer and a segmentation and reassembly (SAR) layer. AAL 205 is operational to accept the user information from continuous signal interface 200 and convert the information into ATM cells. AAL 205 would select the VPI/VCI for the ATM cells based the particular incoming connection. For example, a particular incoming DS0 would use a pre-assigned VPI/VCI. AALs are known in the art and information about AALs is provided by International Telecommunications Union (ITU) document I.363.1. An AAL for voice is also described in patent application Ser. No. 08/395,745, filed on Feb. 28, 1995, entitled "Cell Processing for Voice Transmission", and hereby incorporated by reference into this application. ATM interface 210 is operational to accept ATM cells and transmit them over ATM connection 252

Control interface 215 is functional to accept control messages from mapper 220 and cause particular VPI/VCIs to be enabled/disabled. This could be done by having AAL 205 verify that the VPI/VCI is enabled before generating cells. This could also be done by having ATM interface 210 screen out ATM cells with a disabled VPI/VCI. Those skilled in the art will appreciate various ways to suppress cell transmission over disabled VPI/VCIs.

Mapper 220 is functional to accept routing labels from signaling link 262 and determine if a VPI/VCI should be enabled or disabled. Mapper 220 would require interface software to operate over link 162 and to communicate with control interface 215. Mapper 220 may have discrimination logic to select appropriate routing labels for further processing. These elements have been discussed above.

The system operates as follows. Signaling message routing labels arrive on link 262 and are processed by mapper 220. As discussed, this may require some discrimination to determine if the routing label should be processed by mapper 220. Only routing labels associated with the set-up and tear down of calls using connection 251 need to be processed.

Mapper 220 would determine the affected VPI/VCI using the OPC, DPC, and CIC. If the message type was for an IAM, an enable VPI/VCI control message would be sent to control interface 215. If the message type was for an REL (or possibly an RLC), an disable VPI/VCI control message would be sent to control interface 215. In this way, ATM cells would only be transmitted during the actual call. When the call is terminated, the VPI/VCI is disabled so that empty cells are not transmitted. When another call requires the VPI/VCI, it would be enabled allowing cell transmission. This saves significant bandwidth over prior systems that transmitted cells regardless of whether or not an actual call required the connection.

Those skilled in the art will appreciate variation of the above described embodiment. In some embodiments, other signaling, such as C7 or UNI signaling could be used instead of SS7. In some embodiments, the location of message discrimination might be in the mapper, or in the STP, or distributed in both. In some embodiments, the switch could be programmed to forward copies of the appropriate routing labels to the mapper. A conventional STP could be used in this case. In some embodiments, the actual messages may be passed through the mapper so that no copies need to be made. The mapper would passively read the pertinent information. In some embodiments, the mapper function could reside at the switch, the STP, or independently of other components. In these cases, the mapper would communicate with the mux over a conventional control channel. Also, multiple mappers could be used or a single mapper could be used to control multiple muxes. In addition to these embodiments, other variations will be appreciated by those skilled in the art. As such, the scope of the invention is not limited to the specified embodiments, but is only restricted to the following claims.

What is claimed is:

1. A communications system comprising:
 a processor configured to receive signaling information associated with a continuous signal, process the signaling information to determine when the continuous signal transfers user information and to determine an identifier for asynchronous communications, transfer and enabling instruction for the identifier if the continuous signal will start transferring the user information, and transfer a disabling instruction for the identifier if the continuous signal will stop transferring the user information;
 an interworking device coupled to the processor and configured to receive the continuous signal and the enabling instruction, transfer the user information from the continuous signal in the asynchronous communications with the identifier in response to the enabling instruction, receive the disabling instruction, and stop transferring the user information from the continuous signal in the asynchronous communications with the identifier in response to the disabling instruction; and
 a signal point coupled to the processor and configured to transfer the signaling information to the processor.

2. The communication system of claim 1 further comprising an asynchronous system coupled to the interworking device and configured to transfer the asynchronous communications based on the identifier.

3. The communication system of claim 1 further comprising a switch coupled to the signal point and the interworking device and configured to transfer the signaling information and the continuous signal.

4. The communication system of claim 1 wherein the signaling information comprises at least portions of an initial address message and a release message.

5. The communication system of claim 1 wherein the asynchronous communications comprise asynchronous transfer mode communications.

6. The communication system of claim 1 wherein the processor is configured to process a circuit identification code in the signaling information to determine when the continuous signal transfers the user information and to determine the identifier.

7. The communication system of claim 1 wherein the signal point comprises a signal transfer point configured to transfer the signaling information to the processor based on a destination point code in the signaling information.

8. The communication system of claim 1 wherein the signal point comprises a signal transfer point configured to transfer the signaling information to the processor based on an origination point code in the signaling information.

9. The communication system of claim 1 wherein the signaling information comprises Signaling System #7 routing labels for an initial address message and a release message.

10. A method of operating a communications system comprising:

receiving a first signaling message associated with a continuous signal into a signal point and transferring first signaling information from the first signaling message from the signal point to a processor;

processing the first signaling information in the processor to determine that the continuous signal will carry user information and to determine an identifier;

in response to the determination that the continuous signal will carry the user information, transferring an enabling instruction for the identifier from the processor to an interworking device;

receiving the enabling instruction and the continuous signal carrying the user information in the interworking device;

in response to the enabling instruction, transferring the user information with the identifier from the interworking device in asynchronous communications;

receiving a second signaling message associated with the continuous signal into the signal point and transferring second signaling information from the second signaling message from the signal point to the processor;

processing the second signaling information in the processor to determine that the continuous signal will not carry the user information;

in response to the determine that the continuous signal will not carry the user information, transferring a disabling instruction for the identifier from the processor to the interworking device;

receiving the disabling instruction in the interworking device; and in response to the disabling instruction, stopping the transfer of the user information with the identifier from the interworking device in asynchronous communications.

11. The method of claim 10 further comprising transferring the asynchronous communications from the interworking device through an asynchronous system based on the identifier.

12. The method of claim 10 further comprising generating the first and second signaling messages in a switch, transferring the first and second signaling messages from the switch to the signal point, and transferring the continuous signal from the switch to the interworking device.

13. The method of claim 10 wherein the signaling information comprises at least portions of an initial address message and a release message.

14. The method of claim 10 wherein the asynchronous communications comprise asynchronous transfer mode communications.

15. The method of claim 10 wherein processing the first signaling information comprises processing a circuit identification code in the first signaling information.

16. The method of claim 10 wherein the signal point comprises a signal transfer point and wherein transferring the first and second signaling information to the processor comprises transferring the first and second signaling information based on a destination point code in the first and second signaling information.

17. The method of claim 10 wherein the signal point comprises a signal transfer point and wherein transferring the first and second signaling information to the processor comprises transferring the first and second signaling information based on an origination point code in the first and second signaling information.

18. The method of claim 10 wherein the first signaling information comprises a Signaling System #7 initial address message routing label and the second signaling information comprises a Signaling System #7 release message routing label.

* * * * *